United States Patent Office 2,827,460
Patented Mar. 18, 1958

2,827,460

ALPHA, ALPHA-DIPHENYL-β-AMINO-PROPANOLS

Leonhard Stein, Bad-Soden, Taunus, and Ernst Lindner, Frankfurt am Main, Germany, assignors to Farbwerke Hoechst Aktiengesellschaft vormals Meister Lucius & Brüning, Frankfurt am Main, Germany, a corporation of Germany No Drawing. Application October 17, 1955
Serial No. 541,086

Claims priority, application Germany October 23, 1954

6 Claims. (Cl. 260—247.7)

The present invention relates to alpha,alpha-diphenyl-β-amino-propanols corresponding to the general formula:

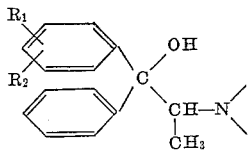

wherein $R_1$ and $R_2$ each represents hydrogen, halogen, hydroxy, lower alkyl, lower alkoxy or benzyloxy radicals, and —N< represents a hydrogenated heterocyclic ring system, to the acid addition salts of these compounds and to a process of preparing them.

It is already known that by reacting a β-tertiary-amino-propionic acid ester with a phenyl magnesium halide, gamma-tertiary-amino-alpha, alpha-diphenyl-propanols can be prepared which are important spasmolytics (cf. German Patent No. 875,660). It has also been proposed to prepare such compounds by the reaction of dialkyl-amino carboxylic acid esters (cf. German Patent No. 682,876).

Now we have found that valuable therapeutic compounds can be obtained by reacting a phenyl magnesium halide in the usual manner with a phenyl ketone or a propionic acid ester basically substituted in the alpha-position by a saturated heterocyclic radical, the phenyl radicals of which compounds may carry substituents, such as halogen atoms, alkyl or alkoxy groups of low molecular weight, or benzyloxy groups, and, if desired, splitting off the benzyl radical from the benzyloxy substituents which may be present.

The phenyl ethyl ketones used as starting materials in the process of this invention, which are basically substituted in the alpha-position and may also contain substituents in the nucleus, can be obtained, for example, by treating propiophenones with bromine and reacting the reaction products obtained with a heterocyclic base. The phenyl radical of the propiophenones may carry different substituents in different positions. The following phenyl radicals may be mentioned more especially: phenyl, ortho-, meta- and para-chlorophenyl, otho-, meta- and para-oxyphenyl, 3- and 4-tolyl, 2- and 4-methoxyphenyl, 3,4-dimethoxyphenyl, 3-ethoxy-phenyl and 4-benzyloxy-phenyl.

As heterocyclic bases there come into consideration, for example, piperidine, pyrrolidine, morpholine and 1.2.3.4-tetrahydro-isoquinoline.

According to this invention the basically substituted phenyl ethyl ketones are reacted in the usual manner with Grignard compounds.

The process of the present invention can also be conducted using as starting material a basically substituted propionic acid ester and subjecting it to gridnardization; the esters used as starting material may be obtained, for example by reacting an alpha-bromo-propionic acid ester with one of the heterocyclic bases mentioned above.

As Grignard compounds there may be used substituted or non-substituted phenyl magnesium halides, the phenyl radicals of which compounds may carry the substituents mentioned above.

If the compounds obtained by the process of this invention are substituted in the phenyl radicals by benzyloxy groups, the benzyl groups can be split off, for example, by catalytic reduction with formation of the corresponding oxyphenyl compounds.

By reaction with an inorganic or organic acid, the bases obtained can be converted into the corresponding salts. As inorganic acids there may be mentioned, for example, hydrohalic acids, such as hydrochloric acid, hydrobromic acid and hydriodic acid, furthermore sulfuric acid, phosphoric acid and amido sulfonic acid. As organic acids there are concerned, for example, formic acid, acetic acid, malonic acid, succinic acid, lactic acid, malic acid, maleic acid, citric acid, benzoic acid, salicyclic acid, para-amino-salicyclic acid, aceturic acid, phenol sulfonic acid, hydroxy ethane sulfonic acid, and ethylene diamine tetra-cetic acid.

The compounds obtained according to the process of this invention are valuable medicaments which are distinguished by their excellent antitussive action. These compounds, and this being surprising, have no analgesic effect as it would have been expected in view of the state of the art. As regards their antitussive action, the compounds obtained by the process of this invention are superior to those of an analogous structure, for example the corresponding compounds of the ethanol series. Such particular efficiency associated with a low toxicity specifically depends on the structure of the products obtained by the process of this invention, as will be demonstrated by the following comparative test of 1.1-diphenyl-2-piperidino-ethanol-(1)-hydrochloride and 1.1-diphenyl-2-piperidino-propanol-(1)-hydrochloride:

| Preparation | Toxicity in mice, intravenous injection dos. let. min. | Antitussive action in cats, intravenous injection |
|---|---|---|
| [diphenyl-CH(OH)-CH(CH₃)-N-piperidino]·HCl | 50 mg./kg. of body weight. | 3 mg./kg. of body weight, almost complete suppression of cough irritation. |
| [diphenyl-C(OH)-CH₂-N-piperidino]·HCl | 30 mg./kg. of body weight. | 5 mg./kg. of body weight, diminishing of cough irritation. |

Already one additional methyl group in the 2-position is associated with a strongly reducing action and leads to a higher toxicity.

The following examples serve to illustrate the invention, but they are not intended to limit it thereto:

Example 1

65 grams of alpha-piperidino propiophenone are added to a Grignard solution of 14 grams of magnesium and 94 grams of bromobenzene in 500 cc. of ether. After boiling for 4 hours under reflux, the reaction mixture is poured onto ice water and the ethereal solution is isolated. The ether in excess is distilled off and the residue is fractionated under reduced pressure. (It boils at 182° C. under a pressure of 2 mm. of mercury.) By neutralization with alcoholic hydrochloric acid, 1.1-diphenyl-2-piperidino-propanol-(1)-hydrochloride is obtained which melts at 198° C.

The alpha-piperidino-propiophenone has been prepared as follows:

134 grams of propiophenone are dissolved in 300 cc. of methylene chloride, treated with 160 grams of bromine to enable bromination and mixed with a solution of 170 grams of piperidine in 100 cc. of water. After stirring for some hours, the aqueous layer is separated, the methylene chloride solution is extracted by agitation with dilute hydrochloric acid, then separated and rendered alkaline with sodium hydroxide solution. The base which separates out is taken up in ether, the ether is distilled off and the residue is distilled under reduced pressure; it boils at 154° C. under a pressure of 10 mm. of mercury.

*Example 2*

58 grams of alpha-piperidino-propionic acid ethyl ester are added dropwise, while cooling, to a Grignard solution of 157 grams of bromobenzene and 24 grams of magnesium in 500 cc. of ether. After the addition has been terminated, the mixture is boiled for some hours under reflux. The reaction mixture is then poured onto ice, the ethereal solution is separated and shaken with dilute hydrochloric acid. 1,1-diphenyl-2-piperidino-propanol-(1)-hydrochloride separates out which melts at 198° C.

*Example 3*

A solution of 100 grams of para-benzyloxy-alpha-piperidino-propiophenone in 400 cc. of ether is added to a Grignard solution of 16 grams of magnesium and 107 grams of bromobenzene in 600 cc. of ether. After boiling for 4 hours under reflux, the whole is poured onto ice, the ethereal solution is isolated and the ether in excess is distilled off. The crystalline residue obtained, which melts at 85–86° C., is neutralized with alcoholic hydrochloric acid, and hydrogenated with palladium and hydrogen. After absorption of the calculated amount of hydrogen, the mixture is separated from the catalyst by filtration and the solution is concentrated. The residue is recrystallized from alcohol. 1-phenyl-1-(para - oxyphenyl) - 2 - piperidino - propanol - (1)-hydrochloride is obtained which melts at 194–196° C.

The para - benzyloxy - alpha - piperidino - propiophenone used as starting material can be obtained in the following manner: 150 grams of para-benzyloxy-propiophenone are dissolved in 300 cc. of methylene chloride, brominated with 100 grams of bromine and reacted with a mixture of 125 grams of piperidine and 100 cc. of water. After boiling for some hours under reflux, the methylene chloride solution is isolated and evaporated. Para - benzyloxy - alpha - piperidino - propiophenone is obtained as residue when when recrystallized from petroleum ether melts at 81–82° C.

*Example 4*

36.4 grams of alpha-pyrrolidino-propiophenone are added, while stirring and cooling, to a Grignard solution prepared from 8.4 grams of magnesium and 56 grams of bromobenzene in 300 cc. of dry ether. After boiling for 4 hours under reflux, the reaction mixture is poured onto ice, the ethereal solution is separated and dried. The ether in excess is distilled off and the residue is neutralized with alcoholic hydrochloric acid. 1,1-diphenyl-2-pyrrolidino-propanol-(1)-hydrochloride is obtained which when recrystallized from isopropanol melts at 203° C.

The preparation of alpha-pyrrolidino-propiophenone boiling at 152–154° C. under a pressure of 12 mm. of mercury was conducted as described in Example 1 by reaction with bromine and subsequent treatment with pyrrolidine.

*Example 5*

40 grams of alpha-morpholino-propiophenone are added to a Grignard solution prepared from 8.4 grams of magnesium and 56.4 grams of bromobenzene in 300 cc. of ether. After boiling for 4 hours, the reaction mixture is poured onto ice and the ethereal solution is separated. The ether in excess is distilled off and the residue is distilled under reduced pressure; it boils at 210° C. under a pressure of 3 mm. of mercury. The base obtained is neutralized with alcoholic hydrochloric acid, 1,1-diphenyl - 2 - morpholino - propanol - (1) - hydrochloride being obtained in the form of crystals which melt at 205–206° C.

The alpha-morpholino-propiophenone which boils at 171–173° C. under a pressure of 12 mm. of mercury has been prepared as described in Example 1 by reaction with bromine and subsequent treatment with morpholine.

*Example 6*

34.3 grams of alpha-piperidino-propiophenone dissolved in 100 cc. of ether are added dropwise, while stirring and cooling, to a Grignard solution prepared from 60.5 grams of 1-chloro-4-bromo-benzene and 7.6 grams of magnesium in 400 cc. of ether. The reaction mixture is then heated for 4 to 5 hours under reflux. The reaction product obtained is poured onto ice and extracted by agitation with water. The isolated ethereal solution is dried with the aid of sodium sulfate and the ether in excess is distilled off. The residue formed is distilled under reduced pressure. The 1-phenyl-1-(4-chlorophenyl)-2-piperidino-propanol-(1) formed distils over at 197–198° C. under a pressure of 2 mm. of mercury. The corresponding hydrochloride after having been recrystallized from isopropyl alcohol melts at 210–212° C.

*Example 7*

A solution of 64 grams of 3.4-dimethoxy-alpha-piperidino-propiophenone is added to a Grignard solution prepared from 72.5 grams of bromobenzene and 11.1 grams of magnesium in 400 cc. of ether and the whole is boiled for 4 hours under reflux. The reaction mixture is then poured onto ice and worked up as described in Example 6. 1 - phenyl - 1 - (3.4 - dimethoxyphenyl) - 2 - piperidino-propanol-(1) is formed which distils over at 210–214° C. under a pressure of 0.01 mm. of mercury. The corresponding hydrochloride melts at 176–177° C.

The 3.4 - dimethoxy - alpha - piperidino - propiophenone used as starting material has been prepared in the following manner: a solution of 62 grams of 3.4-dimethoxypropiophenone in 100 cc. of methylene chloride was brominated with 51 grams of bromine and reacted with 55 grams of piperidine. The 3.4-dimethoxy-alpha-piperidino-propiophenone was used as starting material.

*Example 8*

43 grams of alpha-piperidino-propiophenone are added dropwise, while cooling and stirring, to a Grignard solution prepared from 79.5 grams of 3-ethoxy-1-bromobenzene and 9.5 grams of magnesium in 400 cc. of ether. After boiling for 4 hours, the reaction product is worked up as described in Example 6. The 1-phenyl-1-(3-ethoxyphenyl)-2-piperidino-propanol-(1) distils over at 178–180° C. under a pressure of 0.01 mm. of mercury. The corresponding hydrochloride, after having been recrystallized from isopropanol, melts at 170–171° C.

*Example 9*

58 grams of alpha-piperidino-propiophenone are added, while cooling and stirring, to a Grignard solution prepared from 100 grams of 2-methoxy-1-bromobenzene and 12.8 grams of magnesium in 400 cc. of ether. The reaction mixture is boiled for 4 hours under reflux and then poured onto ice. The reaction product is then worked up as described in Example 6. 1-phenyl-1-(2-methoxy-phenyl)-2-piperidino-propanol-(1) is obtained which solidifies to form crystals melting at 116–118° C. The corresponding hydrochloride melts at 217–218° C.

Example 10

44.5 grams of alpha-piperidino-propiophenone are added, while cooling and stirring, to a Grignard solution prepared from 70 grams of 3-methyl-1-bromobenzene and 9.8 grams of magnesium in 300 cc. of ether. After boiling for some hours, the reaction mixture is worked up as described in Example 6. The base obtained, i. e. 1-phenyl-1 - (3 - methylphenyl) - 2 - piperidino - propanol - (1) distils over at 190–193° C. under a pressure of 2 mm. of mercury. The corresponding hydrochloride after having been recrystallized from ethanol melts at 214–216° C.

Example 11

58 grams of alpha-piperidino-propiophenone are added, while cooling and stirring, to a Grignard solution prepared from 100 grams of 4-methoxy-1-bromobenzene and 12.8 grams of magnesium in 500 cc. of ether. After boiling for 5 hours, the reaction mixture is worked up as described in Example 6. The base obtained, i. e. 1-phenyl-1 - (4 - methoxyphenyl) - 2 - piperidino - propanol - (1) is distilled under reduced pressure. It boils at 212–216° C. under a pressure of 2 mm. of mercury. The corresponding hydrochloride melts at 205–207° C. after having been recrystallized from isopropanol.

Example 12

47 grams of alpha-(1.2.3.4)-tetrahydro-isoquinolino-propiophenone are added to a Grignard solution prepared from 55 grams of bromobenzene and 8.5 grams of magnesium in 300 cc. of ether. After boiling for 4 hours, the reaction mixture is worked up as described in Example 6. 1.1 - diphenyl - 2 - (1.2.3.4) - tetrahydro - isoquinolino-propanol-(1) is obtained in the form of a residue which is then neutralized with alcoholic hydrochloric acid. The corresponding hydrochloride melts at 214–215° C. after having been recrystallized from ethanol.

The alpha - (1.2.3.4) - tetrahydro - isoquinolino - propiophenone used as starting material has been prepared in the following manner: 48 grams of bromine are added dropwise, while cooling, to a solution of 40 grams of propiophenone in 120 cc. of methylene chloride. After the bromination has been terminated, the methylene chloride in excess is distilled off and the residue is mixed with 80 grams of (1.2.3.4)-tetrahydro-isoquinoline and 50 cc. of water. Stirring of the reaction mixture is continued for some hours, the methylene chloride solution which has been isolated is diluted with ether, and the solution is extracted by agitation with dilute hydrochloric acid. With the aid of potassium carbonate alpha - (1.2.3.4) - tetrahydro-isoquinolino-propiophenone is liberated from the isolated hydrochloric acid solution and then distilled under reduced pressure. It boils at 190–193° C. under a pressure of 3 mm. of mercury.

Example 13

65 grams of alpha - (alpha' - methyl) - piperidino - propiophenone are added, while cooling and stirring, to a Grignard solution prepared from 88 grams of bromobenzene and 13.5 grams of magnesium in 400 cc. of ether. After boiling for some hours, the reaction mixture is worked up as described in Example 6. The 1.1 - diphenyl-2-(alpha-methyl)-piperidino-propanol-(1) obtained is distilled under reduced pressure. It boils at 188–189° C. under a pressure of 2 mm. of mercury. The corresponding hydrochloride melts at 199° C. after having been recrystallized from isopropanol.

The alpha - (alpha' - methyl)-piperidino-propiophenone used as starting material has been prepared in the following manner: 50 grams of propiophenone are dissolved in 150 cc. of methylene chloride and brominated with 50 grams of bromine. After the methylene chloride has been distilled off, the residue is mixed with a solution of 80 grams of alpha-methyl-piperidine in 100 cc. of methylene chloride. Alpha - (alpha' - methyl) - piperidino - propiophenone is obtained which boils at 137–139° C. under a pressure of 2 mm. of mercury.

We claim:

1. A compound selected from the group consisting of alpha,alpha - diphenyl - beta - amino - propanols and acid addition salts thereof, said compound having the general formula:

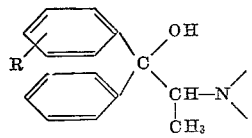

wherein R is a member selected from the group consisting of hydrogen, hydroxy, lower alkyl, lower alkoxy and benzyloxy radicals, and —N stands for a member selected from the group consisting of -piperidino, -2-methyl-piperidino, -pyrrolidino, -morpholino and tetrahydro-isoquinolino radicals.

2. The compound of the formula:

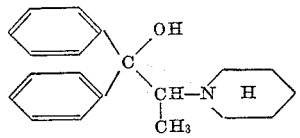

3. The compound of the formula:

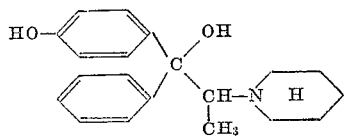

4. The compound of the formula:

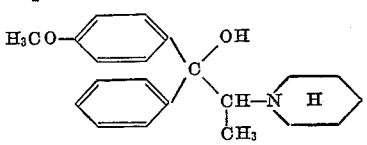

5. The compound of the formula:

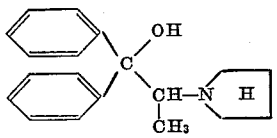

6. The compound of the formula:

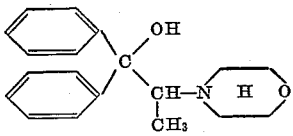

References Cited in the file of this patent

Takagi: Jour. Pharm. Soc. (Japan), vol. 73, pp. 541–3; abstracted in Chem. Abst., vol. 48, 5379(h)(1953).

Takagi: Jour. Pharm. Soc. (Japan), vol. 72, pp. 1592–4; abstracted in Chem. Abst., vol. 47, col. 9312(f) (1952).

Ruddy: Jour. Am. Chem. Soc., vol. 72, pp. 718–21 (1949).

Kissman: Jour. Am. Chem. Soc., vol. 75, pp. 2959–62 (1953).

Sugimoto: Jour. Pharm. Soc. (Japan), vol. 73, pp. 757–60; abstracted in Chem. Abst., vol. 48, cols. 9367–8 (1953).

UNITED STATES PATENT OFFICE
CERTIFICATE OF CORRECTION

Patent No. 2,827,460

March 18, 1958

Leonhard Stein et al.

It is hereby certified that error appears in the printed specification of the above numbered patent requiring correction and that the said Letters Patent should read as corrected below.

Column 2, line 45, in the table, the first formula should be corrected by removing the period between the N in the piperiding ring and the H within the ring and moving the H to approximately the center of the ring to indicate that the ring is fully hydrogenated; same column 2, line 56, for "reducing" read -- increasing antitussive"; line 57, for "higher" read -- lower --.

Signed and sealed this 12th day of May 1959.

(SEAL)
Attest:
KARL H. AXLINE
Attesting Officer

ROBERT C. WATSON
Commissioner of Patents